(12) United States Patent
Darby et al.

(10) Patent No.: US 10,983,045 B2
(45) Date of Patent: Apr. 20, 2021

(54) SPECTROMETER APPARATUS FOR MEASURING SPECTRA OF A LIQUID SAMPLE USING AN INTEGRATING CAVITY

(71) Applicant: VICTORIA LINK LIMITED, Wellington (NZ)

(72) Inventors: Brendan Liam Darby, Wellington (NZ); Eric Le Ru, Wellington (NZ); Matthias Meyer, Wellington (NZ)

(73) Assignee: VICTORIA LINK LIMITED, Wellington (NZ)

( * ) Notice: Subject to any disclaimer, the term of this patent is extended or adjusted under 35 U.S.C. 154(b) by 21 days.

(21) Appl. No.: 16/340,550

(22) PCT Filed: Oct. 11, 2017

(86) PCT No.: PCT/NZ2017/050131
§ 371 (c)(1),
(2) Date: Apr. 9, 2019

(87) PCT Pub. No.: WO2018/070882
PCT Pub. Date: Apr. 19, 2018

(65) Prior Publication Data
US 2019/0257745 A1 Aug. 22, 2019

(30) Foreign Application Priority Data

Oct. 11, 2016 (NZ) ........................................ 725140

(51) Int. Cl.
*G01J 3/02* (2006.01)
*G01J 3/08* (2006.01)
(Continued)

(52) U.S. Cl.
CPC ............ *G01N 21/255* (2013.01); *G01J 3/021* (2013.01); *G01J 3/0254* (2013.01); *G01J 3/08* (2013.01);
(Continued)

(58) Field of Classification Search
CPC .. G01J 3/021; G01J 3/0254; G01J 3/08; G01J 3/42; G01J 3/4412; G01N 2021/0367;
(Continued)

(56) References Cited

U.S. PATENT DOCUMENTS

| | | | |
|---|---|---|---|
| 4,912,720 | A | 3/1990 | Springsteen |
| 4,923,279 | A | 5/1990 | Ainslie et al. |

(Continued)

FOREIGN PATENT DOCUMENTS

| | | |
|---|---|---|
| CN | 2605563 Y | 3/2004 |
| CN | 102384889 A | 3/2012 |

(Continued)

OTHER PUBLICATIONS

Nelson, N. B., and Prezelin B. B. "Calibration of an integrating sphere for determining the absorption coefficient of scattering suspensions." Applied Optics 32.33 (1993): 6710-6717, abstract.
(Continued)

*Primary Examiner* — Hina F Ayub
(74) *Attorney, Agent, or Firm* — Notaro, Michalos & Zaccaria P.C.

(57) ABSTRACT

A spectrometer apparatus for measuring spectra of a liquid sample, such as a beverage like wine. The apparatus has an integrating cavity with a reflective inner wall to receive a cuvette containing the liquid sample within the integrating cavity. A combination of light inlet ports and light outlet ports are provided to receive light from at least one light source and deliver light to a spectrometer. A light path adjuster is configured to selectively adjust a light path through the integrating cavity so at least two distinct light paths are provided wherein when the light path adjuster is in a first configuration, the apparatus is in transmission mode in which light from the light source follows a first light path; when the light path adjuster is in a second configuration, the
(Continued)

apparatus is in a diffusely reflecting mode in which light from the light source follows a second light path.

20 Claims, 6 Drawing Sheets

(51) Int. Cl.
*G01N 21/25* (2006.01)
*G01J 3/42* (2006.01)
*G01J 3/44* (2006.01)
*G01N 21/03* (2006.01)

(52) U.S. Cl.
CPC .............. *G01J 3/42* (2013.01); *G01J 3/4412* (2013.01); *G01N 21/25* (2013.01); *G01N 2021/0367* (2013.01); *G01N 2201/065* (2013.01)

(58) Field of Classification Search
CPC . G01N 21/25; G01N 21/255; G01N 2201/065
See application file for complete search history.

(56) References Cited

U.S. PATENT DOCUMENTS

| | | | |
|---|---|---|---|
| 5,488,473 A | 1/1996 | Springsteen | |
| 6,413,786 B1 | 7/2002 | Hansen et al. | |
| 7,057,730 B2 | 6/2006 | Fry et al. | |
| RE41,682 E | 9/2010 | Fry et al. | |
| 8,767,204 B2 | 7/2014 | Kimura et al. | |
| 2010/0309463 A1 | 12/2010 | Lucke et al. | |
| 2011/0226961 A1 | 9/2011 | Osawa et al. | |
| 2014/0339428 A1* | 11/2014 | O'Brien | G01J 3/42 250/339.07 |
| 2015/0369727 A1 | 12/2015 | Sugioka | |
| 2017/0284939 A1* | 10/2017 | Suzuki | G01J 3/28 |

FOREIGN PATENT DOCUMENTS

| | | |
|---|---|---|
| CN | 202735238 U | 2/2013 |
| CN | 203025084 U | 6/2013 |
| CN | 203101225 U | 7/2013 |
| CN | 103499391 A | 1/2014 |
| EP | 0511806 A2 | 11/1992 |
| EP | 0964244 A1 | 12/1999 |
| EP | 2315004 A1 | 4/2011 |
| JP | S59176653 A | 10/1984 |
| JP | H05113386 A | 5/1993 |
| JP | H06123702 A | 5/1994 |
| JP | H09210848 A | 8/1997 |
| JP | 2014149266 A | 8/2014 |
| WO | 9723159 | 7/1997 |
| WO | 2005100955 A1 | 10/2005 |
| WO | 2012020440 A1 | 2/2012 |

OTHER PUBLICATIONS

International Search Report and Written Opinion for corresponding PCT application No. PCT/NZ2017/050131, dated Dec. 14, 2017.
Fry, Kattawar, Pope, "Integrating cavity absorption meter", Applied Optics vol. 31, Issue 12, pp. 2055-2065, (1992), https://doi.org/10.1364/AO.31.002055.
Nelson, Prezelin, Calibration of an integrating sphere for determining the absorpton coefficient of scattering suspensions, Applied Optics vol. 32, Issue 33, pp. 6710-6717, (1993), https://doi.org/10.1364/AO.32.006710.
T Javorfi, K Naqvi, "Quantitative spectrophotometry using integrating cavities", Journal of Photochemistry and Photobiology B: Biology 82 (2006) 127-131, doi:10.1016/j.jphotobiol.2005.10.002.
A Gaigalas, H He, L Wang, "Measurement of Absorption and Scattering With an Integrating Sphere Detector: Application to Microalgae", J. Res. Natl. Inst. Stand. Technol. 114, 69-81(2009), 10.6028/jres.114.006.
B Darby, B Auguie, "Modified optical absorption of molecules on metallic nanoparticles at sub-monolayer coverage", M Meyer, A Pantoja, E Le Ru, Nature Photonics vol. 10, pp. 40-45 (2016), 10.1038/NPHOTON.2015.205.
Olis Clarity (Company), "Clarity CCD UV/Vis 'Diode Array' for solutions & suspensions"; retrieved Jul. 15, 2019; https://www.olisclarity.com/clarity-ccd.
HOBI Labs (Company), Hydro-Optics Biology & Instrumentation Corporation, "a-Sphere In-situ Spectrophotometer", retrieved Jul. 15, 2019; https://hobilabs.com/cms/index.cfm/37/152/1253/1895/index.html.
Turner Designs (Company), http://www.turnerdesigns.com/products/submersible-fluorometer/icam-in-situ-absorption, retrieved Jul. 15, 2019.
Y Villanueva, C Veenstra, W Steenbergen, "Measuring absorption coefficient of scattering liquids using a tube inside an integrating sphere" Applied Optics vol. 55, Issue 11, pp. 3030-3038 (2016), https://www.osapublishing.org/ao/abstract.cfm?uri=ao-55/11/3030.
Extended European Search Report for corresponding European patent application No. 17859349,6 dated Jun. 5, 2020.

* cited by examiner

SPECTROMETER APPARATUS FOR MEASURING SPECTRA OF A LIQUID SAMPLE USING AN INTEGRATING CAVITY

FIELD OF THE INVENTION

This invention relates to a spectrometer apparatus for measuring spectra of a liquid sample using an integrating cavity and in some embodiments, the invention relates to a UV-vis spectrometer apparatus for measuring turbid liquids.

BACKGROUND

Standard UV-VIS spectroscopy is performed by shining a light source through a sample and measuring the transmitted light as a function of wavelength. The sample is generally a liquid that is contained within a square cuvette placed with the cuvette faces being perpendicular to the light beam. The transmitted light is then converted into an absorption spectrum which gives a measure of the absorbing power of the sample at every wavelength used. Absorbance can be used as a measure of the concentration of dissolved species (absorbance is proportional to concentration, known as the Beer-Lambert Law) or to identify the chemical content of a solution based on absorbance peaks of species at known wavelengths.

UV-VIS spectrometers are a standard instrument in analytical chemistry and can be used for both quantitative and qualitative analysis of liquids. UV-VIS spectrometers measure the spectrum of light directly transmitted by the sample, and determine the absorption spectrum based on the assumption that the only loss of light occurs due to absorption in the sample. This leads to the general requirement of brilliantly clear sample liquids in UV-VIS spectrometers.

In the more general case including turbid liquids, light is lost due to scattering by the sample, and UV-VIS spectrometers will measure the extinction spectrum instead of the absorption spectrum. In short:

extinction=scattering+absorption.

The intensity of light scattered generally is wavelength dependent, leading to a scattering spectrum. In UV-VIS spectrometers absorption and scattering spectra are superimposed and cannot be disentangled without separate knowledge of one of the two constituent spectra. In strongly scattering liquids (e.g. milk, paint, blood, wine) the light reaching the detector is diminished to a degree which renders the absorption spectrum component virtually indiscernible from the measured extinction spectrum, even if the scattering spectrum was known. For scattering/turbid samples standard UV-VIS is therefore of very limited general applicability, and if used, nonetheless requires sample pre-processing (e.g. filtration, centrifugation or other methods to remove the scattering species). Dilution of the sample is generally not helpful because it reduces both scattering and absorbance of the sample in the same proportion.

In summary, there is a significant range of samples where UV-VIS either does not work or time-consuming processing is required in order to allow analysis of cloudy solutions. Moreover, it can be impossible to separate out the relative contribution of scattering and absorption using standard UV-VIS spectroscopy.

OBJECT OF THE INVENTION

It is therefore an object of the invention to provide a spectrometer apparatus which overcomes or at least ameliorates one or more disadvantages of the prior art, or alternatively to at least provide the public with a useful choice.

Further objects of the invention will become apparent from the following description.

SUMMARY OF INVENTION

Accordingly in one aspect the invention may broadly be said to consist in a spectrometer apparatus for measuring spectra of a liquid sample, the apparatus comprising:
an integrating cavity comprising a reflective inner wall or walls, and configured to receive a cuvette containing liquid sample within the integrating cavity,
wherein the integrating cavity comprises at least one light inlet port and at least one light outlet port, the or each light inlet port being configured to receive light from a light source and the or each light outlet port being configured to deliver light to a spectrometer;
the apparatus further comprising a light path adjuster configured to selectively adjust a light path through the integrating cavity such that at least two distinct light paths are provided; wherein
when the light path adjuster is in a first configuration, the apparatus is in a transmission mode in which light from the light source follows a first light path from the or one of the light inlet port(s) to the liquid sample such that the light from the light source irradiates the liquid sample directly before the light transmitted by the sample is transmitted through the or one of the light outlet port(s) and received by the spectrometer for wavelength analysis of the light to provide an extinction spectrum of the liquid sample; and
when the light path adjuster is in a second configuration, the apparatus is in a diffusely reflecting mode in which light from the light source follows a second light path from the or one of the inlet port(s) into the integrating cavity, is incident onto the reflective inner wall or walls of the integrating cavity and is diffusely reflected within the integrating cavity, such that the light from the light source irradiates the liquid sample before being transmitted through the or one of the light outlet port(s) and received by the spectrometer for wavelength analysis of the light to provide an absorbance spectrum of the liquid sample contained in the cuvette.

Such a spectrometer apparatus may in particular be used to obtain spectra being the absorption and extinction spectra of the sample, whereby using a suitable calibration procedure implemented by one or more electronic data processors yields absorbance and extinction spectra that are defined for a given path length through the sample, By providing an apparatus which can be used in each of the above configurations it is possible to obtain quantitative spectra where the path length of light through the sample in each configuration is well defined so that the data obtained in each configuration are relatable.

The apparatus may be configured such that, when in the second configuration, light from the second light path is transmitted:
a) directly from an inlet port onto the wall or walls of the integrating cavity; and/or
b) directly from an inlet port, onto and through the sample and subsequently onto the wall or walls of the integrating cavity.

Thus, when in the second configuration, the second light path may be transmitted from the inlet port either first through the sample or directly onto the cavity wall or walls. With either variant, the apparatus is configured such that the outlet port that is used in the second configuration does not look at the inlet port. In other words, the outlet port used in the second configuration "faces" the walls of the integrating cavity. An outlet port for example can be at 90° to an inlet port, or any other position on the integrating cavity. The relative position of the inlet port and outlet port used in the second configuration is such that the spectrometer does not collect the incident light or the light directly transmitted from the sample.

Preferably, when in the first configuration the inlet port is directly opposed from the outlet port such that, the first light path extends directly across the integrating cavity.

In another aspect of the invention there is provided a spectrometer apparatus for measuring spectra of a liquid sample, in particular where the spectra obtained are the absorption and extinction spectra of the sample, the apparatus comprising:

an integrating cavity comprising a reflective inner wall or walls, and configured to receive a cuvette containing liquid sample within the integrating cavity, wherein the integrating cavity comprises at least one light inlet port and at least one light outlet port, the light inlet port being configured to receive light from a light source and the light outlet port being configured to deliver light to a spectrometer;

the apparatus further comprising a light path adjuster configured to selectively adjust a light path through the integrating cavity such that at least two distinct light paths are provided; wherein when the light path adjuster is in a first configuration, the apparatus is in a transmission mode in which light from the light source follows a first light path from the light inlet port to the liquid sample such that the light from the light source irradiates the liquid sample directly before the light transmitted by the sample is collected via the light outlet port positioned directly opposite the inlet port and received by the spectrometer for wavelength analysis of the light to provide an extinction spectrum of the liquid sample; and when the light path adjuster is in a second configuration, the apparatus is in a diffusely reflecting mode in which light from the light source follows a second light path from the inlet port into the integrating cavity, and is incident onto either the reflective inner wall or walls of the integrating cavity or directly onto the liquid sample; wherein the light transmitted and/or scattered by the sample is transmitted through the outlet port, the apparatus being configured such that light directly transmitted and/or reflected by the sample is reflected by the inner wall or walls of the cavity before being transmitted through the outlet port, and received by the spectrometer for wavelength analysis of the light to provide an absorbance spectrum of the liquid sample contained in the cuvette.

Preferably, using a suitable calibration procedure yields absorbance and extinction spectra that are defined for a given path length through the sample, A preferred implementation of the second configuration is to position the outlet port such that it directly faces an area of the cavity wall that the light from the inlet port does not directly illuminate.

The apparatus, used in both configurations and with a suitable calibration procedure, yields both the extinction and absorption spectrum of the liquid sample, where the path length through the sample in both said configurations is well defined, such that the spectra obtained give wavelength-dependent extinction and absorption coefficients of the sample respectively across the wavelength range of the light illuminating the sample.

The apparatus may comprise one or more integral light source(s), or the light source may be configured to be connected to one or more separate light source(s).

The apparatus may further comprise an integral or remote controller configured to control the light path adjuster to selectively adjust the path of light through the apparatus.

30 The controller is preferably configured to control the spectrometer, and in particular is configured to process the light received by the spectrometer for wavelength analysis of the light to provide the extinction and/or absorbance spectrum of the liquid sample contained in the cuvette. The spectrometer may be integral with the apparatus.

The controller or controllers may be configured to control one or more of:
a) switching between the first and second configurations;
b) acquiring spectra from the integrating cavity;
c) choosing operating conditions;
d) displaying spectra on a display of the apparatus, or of the controller, or in communication with the apparatus or controller;
e) saving data on a memory of the apparatus, or of the controller, or in communication with the apparatus or controller;
f) a user-interface of the apparatus, or of the controller, or in communication with the apparatus or controller, that interacts with the apparatus and allows a user to control the position of the light path adjuster.

The light path adjuster may comprise at least one movable optical element configured to manipulate light incident on the optical element from the light source, the light path adjuster being configured to adjust the movable optical element to selectively provide the first and second light paths.

The optical element may be adjustable by moving the optical element with respect to the integrating cavity from a first position in which the light travels along the first light path, and a second position in which the light travels along the second light path.

The integrating cavity comprises orthogonal longitudinal, vertical, transverse axes, and any one or more of the following positional characteristics of the optical element may be adjusted with respect to any one or more of the axes:
a) longitudinal position;
b) vertical position;
c) transverse position
d) orientation;
e) inclination.

A plurality of movable optical elements may be provided.

The movable optical element is preferably selected from any one or combination of:
a prism;
a lens;
a mirror;
a diffraction grating;
a fibre optic cable;
the light source;
a shutter.

The light path adjuster may additionally or alternatively comprise at least one fixed optical element which is not adjustable with respect to the integrating cavity. The fixed optical element may be configured to manipulate the light from the light source prior to the light inlet port. The fixed optical element may be configured to manipulate the light from the light outlet port.

The fixed optical element may be selected from any one or combination of:
a) a prism;

b) a lens;
c) a mirror;
d) a diffraction grating;
e) a fibre optic cable;
f) the light source.

The light path adjuster may comprise at least one electronic controller operative to effect selective operation of one or more light sources, to selectively provide the first and second light path.

The apparatus may comprise at least first and second light sources, the controller being configured to control each light source independently. The light sources could be switched on and off in a blinking or sequential fashion wherein in configuration one the first light source is switched on and in configuration two the second light source is on with the first off. The light sources may be controlled such that both or all light sources can be switched off, to acquire a dark spectrum.

The light path adjuster may be positioned:
a) between the light source and the light inlet port and/or
b) between the spectrometer and the light outlet port.

A plurality of light path adjusters may be provided.

A plurality of light inlet ports may be provided, the light path adjuster being configured to provide the first light path by directing light from the light source through a first light inlet port, and to provide the second light path by directing light from the light source through a second light inlet port.

A plurality of light outlet ports may be provided, the first light path directing light from the integrating cavity through a first light outlet port, and the second light path directing light from the integrating cavity through a second light outlet port.

The integrating cavity may comprise any one of:
a) a diffusely reflecting spherical integrating cavity;
b) a cylindrical cavity;
c) a cuboidal or square cavity.

It will be appreciated that the integrating cavity may be any other shape or combination of shapes.

The integrating cavity may comprise an internal coating configured to provide any one or more of:
a) specular reflectance;
b) diffuse reflectance;
c) reflectance in the UV light spectrum;
d) reflectance in the visible light spectrum;
e) reflectance in the infra-red spectrum.

The light source may comprise any one or more of:
a) a quartz-halogen source;
b) an LED;
c) a laser;
d) any polychromatic source.

The shape of the cuvette may be:
a) square;
b) plate-like;
c) cylindrical;
d) spherical;

The apparatus may be a UV-VIS spectrometer apparatus.

The apparatus may further comprise a sample holder configured to retain a cuvette containing liquid sample within the integrating cavity.

The light source may comprise first and second LED light sources, and the light path adjuster comprises a controller configured to control the first and second LED light sources such that when in the first configuration, the first LED light source is controlled to provide light on the first light path, and when in the second configuration the second LED light source is controlled to provide light on the second light path.

Light from each LED light source may be delivered to the integrating cavity via a respective fibre optic cable. Each LED light source may deliver light to a respective light inlet port. Each light path delivers light through a respective light outlet port.

The first LED light source may be associated with a collimation lens positioned between the first LED light source and the light inlet port associated with that LED light source The apparatus may further comprise first and second outlet ports, and a beam splitter configured to selectively allow light from the first and second outlet ports to be transmitted to the spectrometer.

According to another aspect of the invention there is provided a spectrometer apparatus for measuring spectra of a liquid sample, the apparatus comprising:

an integrating cavity comprising a reflective inner wall or walls, and configured to receive a cuvette containing liquid sample within the integrating cavity, wherein the integrating cavity comprises a first light inlet port and a second light inlet path at least one light outlet port, the first light inlet port being configured to receive light from a first LED light source and the second light inlet port being configured to receive light from a second LED light source, at least one light outlet port being provided and configured to deliver light to a spectrometer;

the apparatus further comprising a light path adjuster configured to selectively adjust a light path through the integrating cavity such that at least two distinct light paths are provided; wherein when the light path adjuster is in a first configuration, the apparatus is in a transmission mode in which light from the first LED light source follows a first light path from the first light inlet port to the liquid sample such that the light from the first LED light source irradiates the liquid sample directly before the light transmitted by the sample is transmitted through the light outlet port and received by the spectrometer for wavelength analysis of the light to provide an extinction spectrum of the liquid sample; and when the light path adjuster is in a second configuration, the apparatus is in a diffusely reflecting mode in which light from the second LED light source follows a second light path from the second inlet port into the integrating cavity, is incident onto the reflective inner wall or walls of the integrating cavity and is diffusely reflected within the integrating cavity, such that the light from the light source irradiates the liquid sample before being transmitted through the, or another, light outlet port and received by the spectrometer for wavelength analysis of the light to provide an absorbance spectrum of the liquid sample contained in the cuvette.

The spectrometer apparatus may be configured to measure spectra of a liquid sample selected from any one or more of the following:
a. Water;
b. Wine;
c. A beverage;
d. An edible liquid or partially liquid product.

According to a further aspect of the invention there is provided a method of measuring spectra of a liquid sample using the apparatus of any of the other aspects of the invention, comprising steps of:
a. activating the light source;
b. controlling the light path adjuster to be in the transmission mode or the diffusely reflecting mode; and
c. conducting wavelength analysis of the light transmitted through the light outlet port via the spectrometer for wavelength analysis of the light to provide an absorbance and/or extinction spectrum of the liquid sample contained in the cuvette.

DETAILED DESCRIPTION OF THE DRAWINGS

A number of embodiments of the invention will now be described by way of example with reference to the drawings in which.

DETAILED DESCRIPTION

Figure 1:
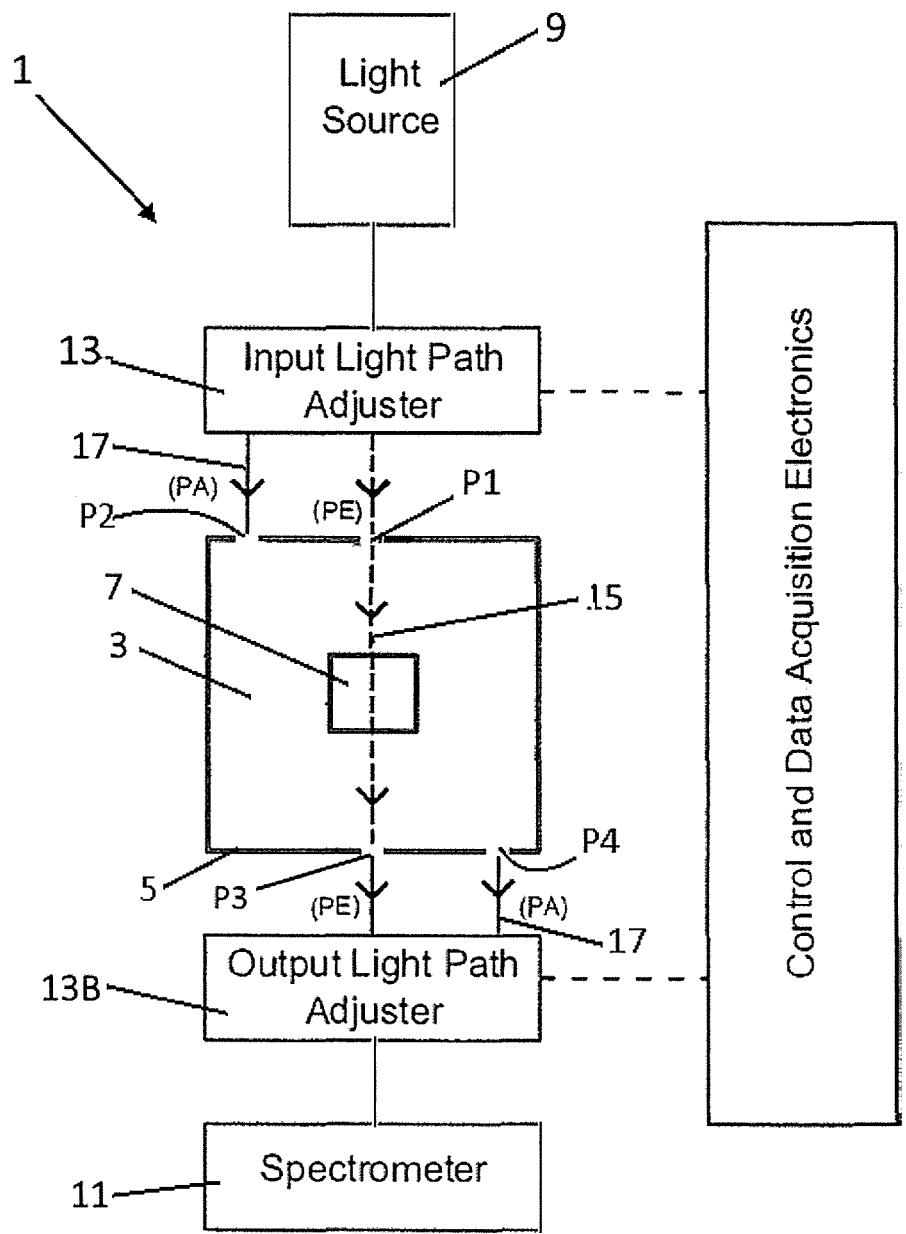
FIG. 1 is a schematic view of example components of a spectrometer apparatus in accordance with the invention.

Throughout the description like reference numerals will be used to refer to like features in different embodiments.

With reference to FIG. 1, a spectrometer apparatus 1 for measuring spectra of a liquid sample is provided which is configured to be able to measure multiple optical properties of a liquid sample, of which the properties are the wavelength dependent extinction and absorption coefficients of the liquid.

The apparatus 1 comprises an integrating cavity 3 comprising reflective inner walls 5, and configured to retain a cuvette 7 containing liquid within the integrating cavity 3, with light from a light source 9 being delivered into the cavity 3 via different light paths 15, 17 entering the cavity 3, the different light paths 15, 17 being selectively adjustable via a light path adjuster 13. The light path adjuster 13 is used to deliver the light into the cavity 3 through at least one inlet port P1, P2 along different paths depending on the configuration of the light path adjuster 13.

The apparatus 1 further comprises at least one light outlet port P3, P4 configured to deliver light to a spectrometer 11. In some examples, an output light path adjuster 13B is provided that controls the path of light from the integrating cavity 3 to the spectrometer 11.

In the first configuration, the apparatus 1 is in a transmission mode, where the input path adjuster 13 is positioned such that the light from the light source 9 entering the cavity 3 through an inlet port P1 so as to directly illuminate the liquid contained in the cuvette 7 and the outlet light path adjuster 13B is configured such that the light collected through an outlet port P3, and sent to the spectrometer 11 so that a proportion of light from the light source 9 is directly transmitted by the sample after illuminating the sample. In this configuration, the extinction spectrum of the sample is obtained.

In the second configuration, the apparatus 1 is in a diffusely reflecting mode, where the inlet light path adjuster 13 is positioned such that the light from the light source 9 entering the cavity 3 through an inlet port P2 can either directly illuminate the liquid contained in the cuvette 7 or can be incident on the cavity wall 5 and be diffusely reflected within the cavity 3 before interacting with the liquid sample. Furthermore in this second configuration, the outlet light path adjuster 13B is configured such that the light transmitted and/or reflected by the sample and collected through outlet port P4 and sent to the spectrometer 11 has undergone at least one reflection from the cavity walls 5 before entering the outlet port P4. In this configuration, the absorption spectrum of the sample is obtained, free from the effects of scattering by the liquid sample.

The means of switching between configuration modes is provided by one or more electronic controllers that select the configuration of both the inlet light path adjuster 13 and the outlet light path adjuster 13B (if provided), to obtain either the extinction or absorption spectrum of the liquid sample depending on the configuration mode that is selected.

The apparatus 1, and method of use of the apparatus 1, allows the measurement of the extinction and absorption spectrum of a liquid sample using a single apparatus and without movement of the liquid sample.

Figure 2A:
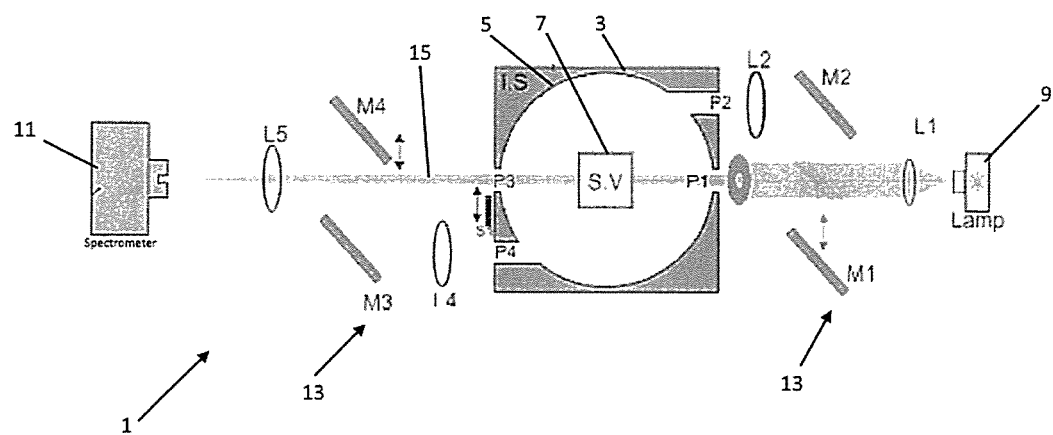
FIGS. 2a and 2b are schematic views of a first embodiment of a spectrometer apparatus in accordance with the invention, in first and second configurations.
Figure 2B:
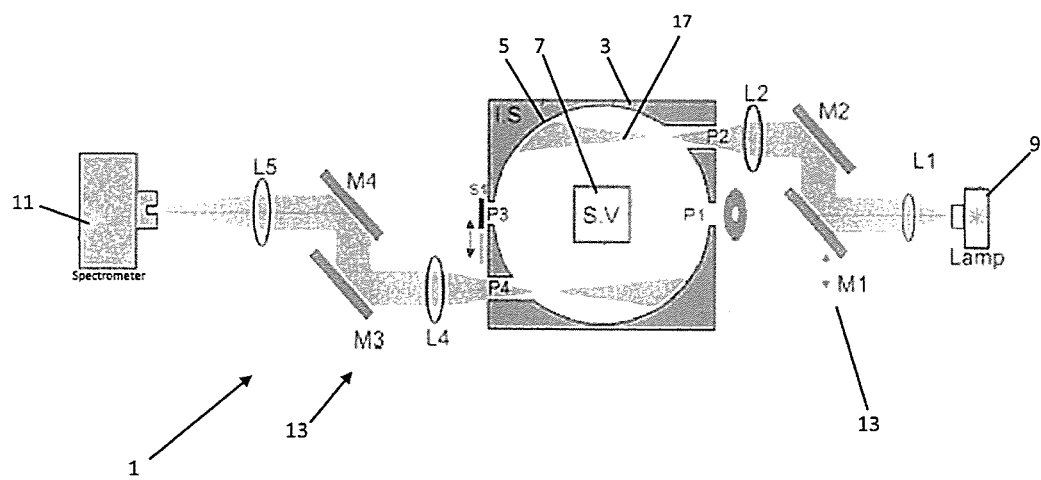

Referring now to FIGS. 2a, 2b, a first embodiment of a spectrometer apparatus 1 for measuring spectra of a liquid sample comprises an integrating cavity 3 comprising a reflective inner wall or walls 5, and configured to retain a cuvette 7 containing liquid sample within the integrating cavity 3. The integrating cavity 3 comprises at least one light inlet port P1, P2 and at least one light outlet port P3, P4, the light inlet port(s) P1, P2 being configured to receive light from a light source 9 and the light outlet port(s) P3, P4 being configured to deliver light to a spectrometer 11.

The apparatus 1 further comprises a light path adjuster 13 configured to selectively adjust a path of light through the integrating cavity 3 such that at least two distinct light paths 15, 17 are provided.

When the light path adjuster 13 is in a first configuration, the apparatus 1 is in a transmission mode in which light from the light source 9 follows a direct light path 15 from the, or one of the, light inlet ports P1, to the liquid sample such that the light from the light source 9 irradiates the liquid sample directly before being transmitted through the, or one of the, light outlet ports P3, P4 and received by the spectrometer 11 for wavelength analysis of the light to provide an extinction spectrum of the liquid sample in the cuvette 7.

When the light path adjuster 13 is in a second configuration, the apparatus 1 is in a diffusely reflecting mode in which light from the light source 9 follows a light path 17 from the, or one of the, inlet ports P1, P2 into the integrating cavity 3, and is either:

a) incident directly onto the reflective inner wall or walls 5 of the integrating cavity 3 and is diffusely reflected within the integrating cavity 3, such that the light from the light source 9 irradiates the liquid sample indirectly; or b) incident directly (not shown) onto the liquid sample 7 such that the light from the light source 9 irradiates the liquid sample directly and the light transmitted and/or reflected by the sample is diffusely reflected within the integrating cavity The light is subsequently transmitted through the, or one of the, light outlet ports P3, P4 and received by the spectrometer 11 for wavelength analysis of the light to provide an absorbance spectrum of the liquid sample contained in the cuvette 7.

The apparatus 1, and method of use of the apparatus, allows the measurement of the extinction and absorption spectrum of a liquid sample using a single apparatus and without movement of the liquid sample. The method consists of placing a liquid sample, which may be contained in a standard 1 cm square cuvette 7, in an integrating cavity 3 and delivering light to the sample either in a transmission or diffusely reflecting configuration. In the first configuration, the light transmitted by the sample is sent to a spectrometer 11 and an extinction spectrum is obtained, while in the second configuration light is diffusely reflected within the cavity 3 and interacts with the sample, so that the light scattered by the sample is not lost. In the second configuration the light may initially interact with the sample, or be incident directly on the walls of the cavity. The spectrum collected by the spectrometer 11 in the second configuration can then be related to the absolute absorption spectrum with suitable calibration and modelling. Switching between measurement configurations is provided via one or more adjustable optical elements L1-L5, M1-M4, configured to manipulate the light from the light source 9 prior to the light entering the integrating cavity 3. Such optical elements can comprise one or more shutters and/or moveable mirrors that control the light path through the integrating cavity 3, and as such allow both the extinction and absorption spectrum of the liquid to be obtained using a single apparatus 1.

The apparatus 1 suspends or supports a sample cuvette 7 within an integrating cavity 3, whereby the latter has a specific light inlet/outlet port configuration which, in combination with one or more optical elements, allows two distinct light-paths to be provided through the integrating cavity 3 between the light source 9 and spectrometer 11, and in particular the light detector of or connected to such a spectrometer.

The skilled person will appreciate that the first and second light paths through the integrating cavity 3 may be provided in a number of different ways, and by varying one or more of at least the following:

a. The number of, and/or position of inlet ports;
b. The number of, and/or position of outlet ports;
c. The number of, and/or position of, and/or type of, movable optical elements;
d. The number of, and/or position of, and/or type of any auxiliary fixed optical elements that may be used;
e. The relative position of the integrating cavity with respect to the light source and/or the spectrometer.

In practice the use of the apparatus 1 provides one or more of the following advantages:

A method for performing standard UV-VIS measurements as in any other device available on the market with standard cuvettes.
The ability to switch to an absorbance mode to remove any effects of scattering.
Retrieval of both the extinction and absorbance spectra immediately, from the perspective of the user.
Measurement of absorption and extinction spectra in a single instrument and without user intervention.
Convenient sample replacement through a cavity port, akin to replacement in a standard UV-VIS instrument
Provides a means to determine the absolute absorbance of turbid/scattering media Different Inlet Ports With reference to the first example of FIGS. 2a and 2b, light is transmitted from the light source 9 into the integrating cavity 3 along first light path 15 through one of two light inlet ports P, P2. When the apparatus 1 is in the first configuration, light enters through first light inlet port P1, and is directly incident on the liquid sample in the cuvette 7. The light transmitted by the liquid sample is collected via first light outlet port P3 and is processed in the same way a standard UV-VIS measurement would be done, by measuring the wavelength dependent extinction spectrum of the sample which determines the wavelength dependent extinction coefficient of the sample.

In the second configuration, the light from the light source is sent through P2 along second light path 17 and is directly incident on the reflective walls 5 of the cavity 3 first. The surface of the walls 5 of the cavity 3 is, to a good approximation, a perfect diffuse reflector (lambertian surface). The incident light thus spreads diffusely in the cavity 3 and illuminates and interacts with the sample. Light may be absorbed by the sample, but light scattered by the sample remains part of the diffuse illumination present in the cavity 3.

In the second configuration, the light is then collected via second light outlet port P4 that is specifically positioned such that as much as possible of the light directly transmitted or reflected by the sample does not enter outlet port P4 before it is reflected from the cavity walls 5, and is processed by the spectrometer 11, allowing the true absorbance spectrum of the sample to be determined, without spectral light loss due to scattering. Switching between extinction and absorbance modes is done via the light path adjuster without needing to change the sample position or any other optics of the apparatus.

The light path adjuster 13 thus adjusts the light received by the integrating cavity 3 from the light source 9 to provide a first light path 15 in which light is directly incident in the liquid sample and not on the walls 5 of the cavity 3, and a second light path 17 in which light is directly incident on the walls 5 of the cavity 3 but not on the liquid sample.

In the example of FIG. 1, the light path adjuster 13 comprises optical elements in the form of two transversely spaced part, angled set of inlet mirrors M1, M2 between the light source 9 and cavity 3, and a corresponding pair of transversely spaced apart, angled set of outlet mirrors M3, M4 between the cavity 3 and the spectrometer 11. In this example, the cavity 3 comprises two transversely space apart light inlet ports P1, P2, and comprises two transversely space apart light outlet ports P3, P4. In this example, a plurality of lens L1-L5 are provided in different positions along the first and second light paths 15, 17. The light path adjuster also comprises a movable shutter S1 configured to open and close first outlet port P3.

One inlet mirror M1 and one outlet mirror M4 are both movable along the transverse axis of the cavity 3, whilst second inlet mirror M2 and second outlet mirror M3 are fixed and not movable. In the first configuration, both sets of mirrors are in a position in which they do not impede a notional path from the light source 9, first inlet port P1, the liquid sample, and the first outlet port P3. In this position light from the light source 9 is transmitted along a direct light path 15 and is directly incident on the liquid sample.

In parallel, when mirror M1 is out of the first light path 15, shutter S1 is simultaneously open, allowing light transmitted by the sample to exit the cavity 3 from the extinction light outlet port P3. Moveable outlet mirror M3 is also simultaneously positioned out of the first light path 15 such that the light exiting P3 can be focused directly onto the spectrometer 11 via lens L5.

In configuration 2, the moveable inlet mirror M1 is placed in the light path between the light source 9 and the first inlet port P1, with mirror M1 being positioned at 45° to the light path such that the light is directed to the fixed mirror M2 which consequently allows the light to be focused into the absorption light inlet port P2 via the focusing lens L2. In this configuration, the light is incident directly onto the interior wall 5 of the cavity 3 and is diffusely reflected within the cavity 3. The light within the cavity 3 is then collected via the outlet port P4 using lens L4 and sent to the spectrometer. Light is prevented from exiting the cavity 3 via the first outlet port P3 because this has been closed by movable shutter S1.

In practice the use of the apparatus 1 provides one or more of the advantages stated above.

The apparatus 1 may comprise, or be in communication with, an electronic controller/software configured to perform the measurement i.e. reference and sample measurement, acquisition time, integration time and display of obtained extinction, absorbance and scattering spectra.

Same Inlet Port

Figure 3A:
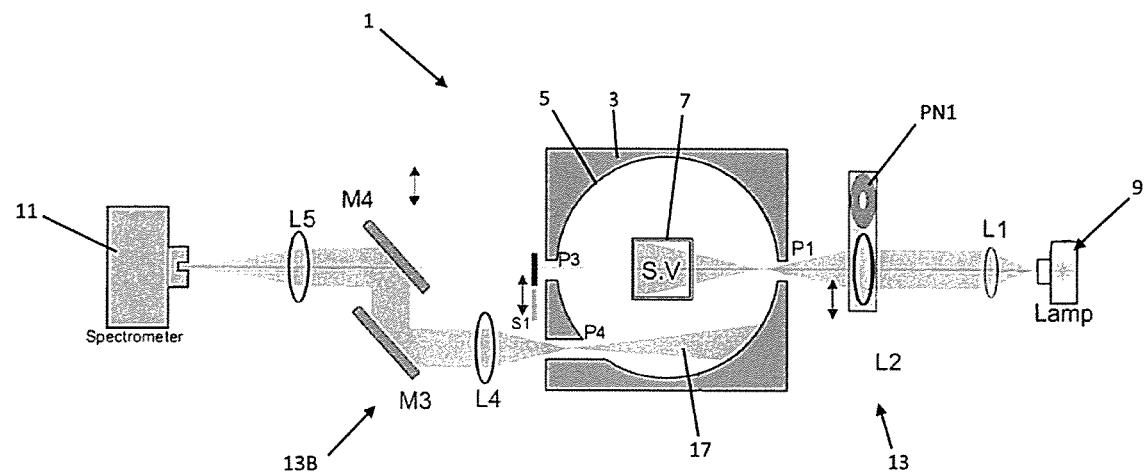
FIGS. 3a and 3b are schematic views of a second embodiment of a spectrometer apparatus in accordance with the invention, in first and second configurations.
Figure 3B:
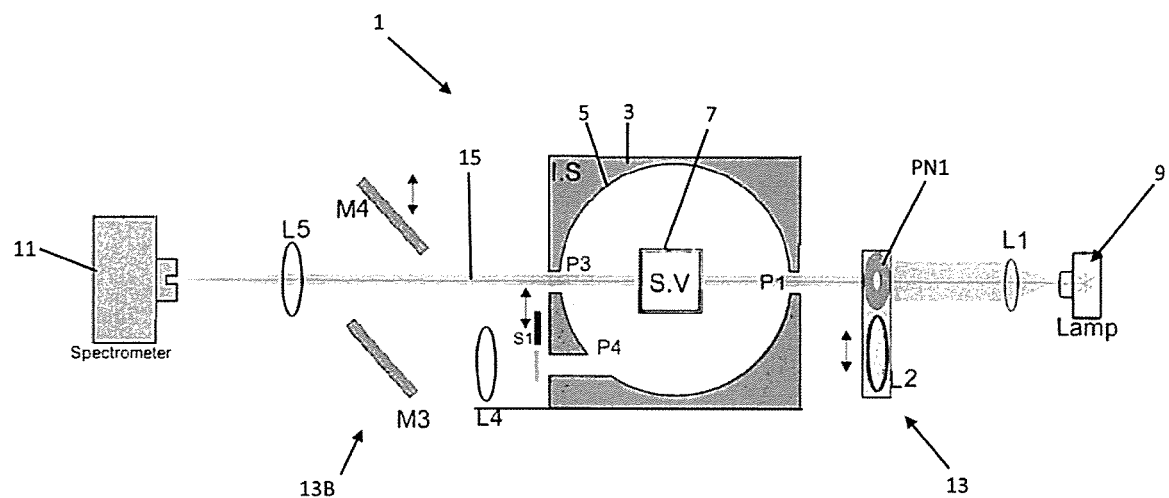

Referring now to FIGS. 3a and 3b, a second embodiment of apparatus 1 is provided with like features being given like references. In this example, the apparatus 1 is similar to that of FIGS. 2a and 2b, but a single light inlet port P1 is provided. The light path adjuster 13 comprises a combined pinhole-lens system comprising pinhole PN1 and focusing lens L2 placed between the light source 9 and the inlet port P1 and the moveable shutter S1 placed after the outlet ports P3 and P4. In the first configuration, shown in FIG. 3b the light path adjuster 13 is configured such that such that pinhole PN1 is aligned with the incoming light path and the light entering the inlet port P1 is essentially collimated and in this position light from the light source 9 is transmitted along a direct light path 15 and is directly incident on the liquid sample. In parallel, when pinhole PN1 is in the light path, shutter S2 is simultaneously closed allowing light transmitted by the sample to exit the cavity 3 from the extinction light outlet port P3. Moveable outlet mirror M3 is also simultaneously positioned out of the first light path 15 such that the light exiting P3 can be focused directly onto the spectrometer 11 via lens L5.

In configuration 2, the light path adjuster is 13 is positioned such that the input pinhole PN1 is out of the light path and the focusing lens L2 is in the light path and the incident light from the light source 9 is focused onto the inlet port P1 such that the light is transmitted along a direct light path to the sample but because it has been focused to a point at the inlet port position, the light is divergent such that the light illuminates the entire transverse width of the sample cuvette. In parallel, when focusing lens L2 is in the light path, the shutter S2 is simultaneously open, covering the outlet port P3 with moveable mirror M4 positioned at 45° to the light path, In this configuration, light scattered, transmitted and reflected by the sample is diffusely reflected within the cavity 3 which then allows light that has been diffusely reflected within the cavity 3 to exit the cavity 3 from the absorption outlet port P4. This light is then collected via the outlet port P4 using lens L4 and sent to the spectrometer via mirror M3 and moveable mirror M4.

Shutter Selection Avoiding Sample

Figure 4:
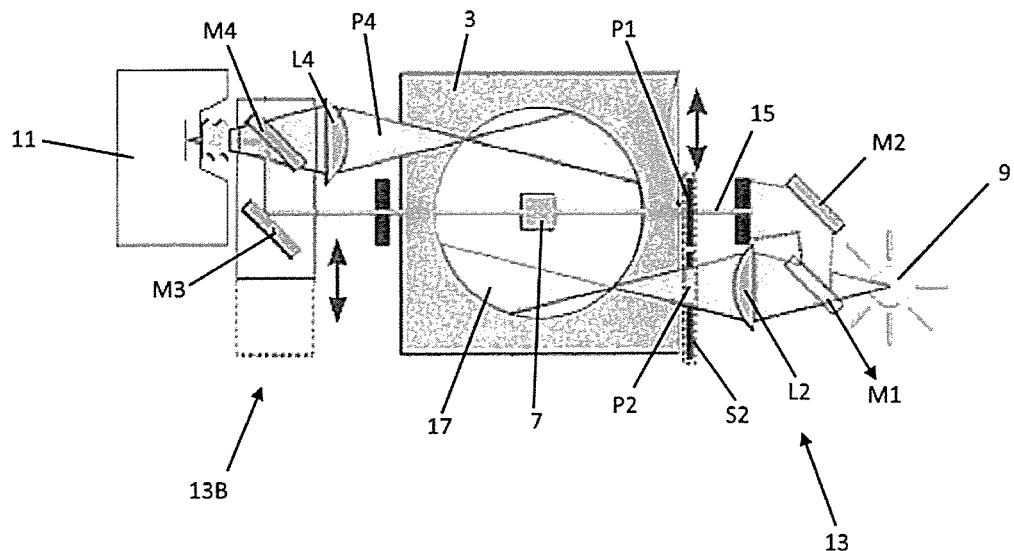
FIG. 4 is a schematic view of a third embodiment of a spectrometer apparatus in accordance with the invention, simultaneously illustrating first and second configurations of the apparatus.

Referring now to FIG. 4, a third embodiment of apparatus 1 is provided with like features being given like references. In this example, the movable inlet mirror M1 has been replaced by an inlet shutter S2, and a second fixed inlet mirror M1. The outlet mirrors M3, M4 are together transversely movable from a position as shown in FIGS. 2a and 2b in which angled outlet mirror M3 is in the light path of outlet port P3 so as to direct light from first light path 15 onto second outlet mirror M4 and onto spectrometer 11. Outlet shutter S1 comprises a shutter aperture which is aligned with outlet port P3 in this first configuration. Inlet shutter S2 comprises a pair of transversely spaced apart shutter apertures. In the first configuration the shutter S2 is positioned such that one of the shutter apertures is aligned with inlet port P1, but with inlet port P2 closed. Angled, fixed inlet mirrors M1, M2 direct light to inlet port P1.

In the second configuration inlet shutter S2 is moved transversely such that inlet port P1 is closed and inlet port P2 aligned with one of the inlet shutter S2 apertures such that light from light source 9 is transmitted directly into inlet port P2. Outlet mirrors M3, M4 are moved transversely so that mirror M3 is not in the light path between outlet port P4 and spectrometer 11.

Shutter Selection Straight Through Sample

Figure 5:
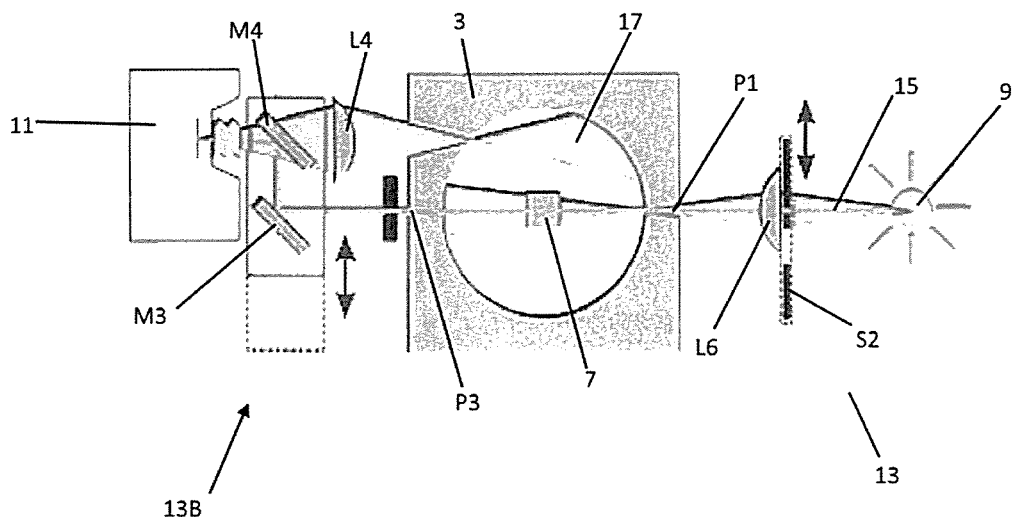
FIG. 5 is a schematic view of a fourth embodiment of a spectrometer apparatus in accordance with the invention, simultaneously illustrating first and second configurations of the apparatus.

With reference to FIG. 5, fourth embodiment of apparatus 1 is provided with like features being given like references. In this example, the apparatus 1 is similar to that of FIG. 4, but no inlet mirrors are provided. The inlet shutter S2 is provided adjacent an inlet lens L6. Transverse adjustment of the position of the inlet shutter S2 aligns one or other shutter aperture with the inlet lens L6 and the light source. One inlet shutter aperture is relatively small, and the other is relatively large. By adjusting which aperture is aligned with the light source, in combination with lens L6, it is possible for both light paths 15, 17 to be directly incident on the liquid sample, with the first light path passing through the sample and exiting the cavity via outlet port P3, and the second light path also passing through the liquid sample but diffusing into contact with the walls 5 of the cavity 3 before exiting cavity 3 via second outlet port P4, when outlet shutter S1 closes first outlet port P3.

Figure 6:
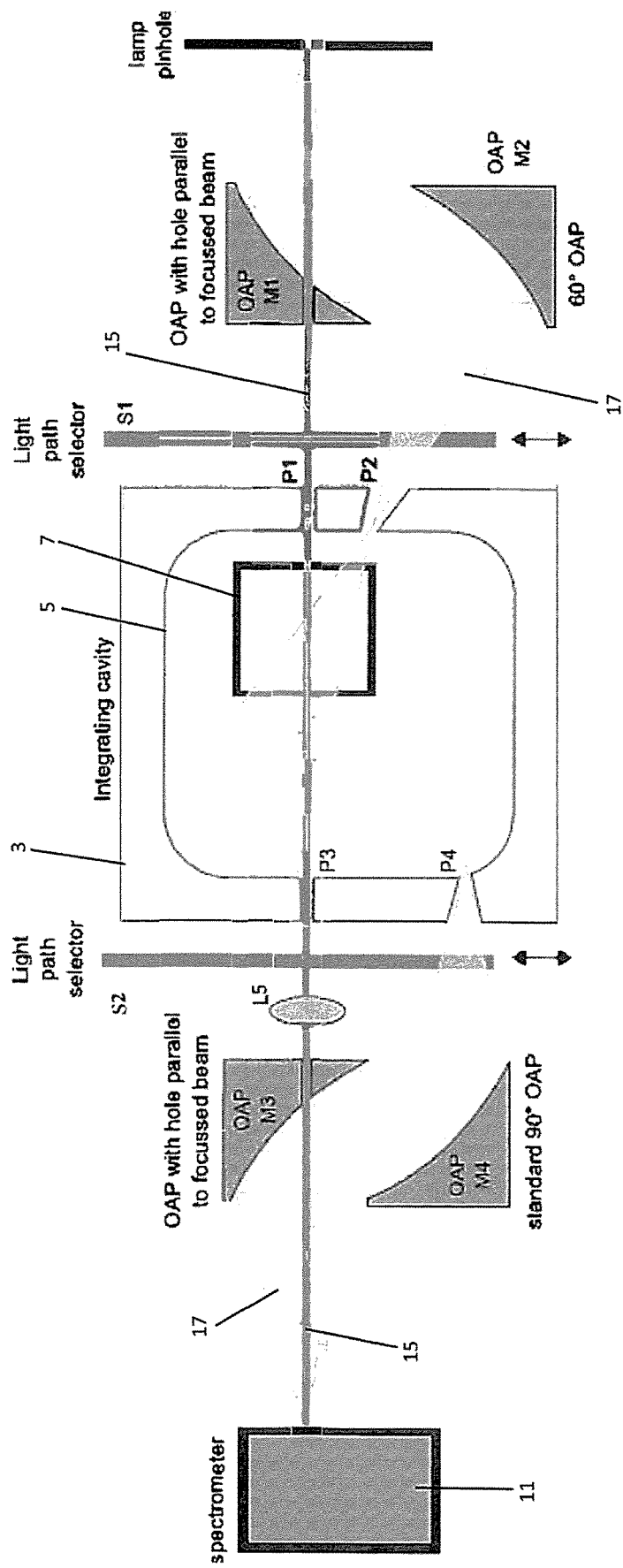
FIG. 6 is a schematic view of a fifth embodiment of a spectrometer apparatus in accordance with the invention, simultaneously illustrating first and second configurations of the apparatus.

Referring now to FIG. 6, a fifth embodiment of apparatus 1 is provided with like features being given like references. In this example, the apparatus 1 is similar to that of FIGS. 3a and 3b but the manipulation of the optical path for two different configurations is provided via off-axis parabolic (OAP) mirrors instead of lenses and flat mirrors. There are furthermore two inlet ports P1, P2 provided in this embodiment. In this example, the OAP M1 comprises a mirror, placed between the light source 9 and the first inlet port P1, with a hole drilled through the center, parallel to the incident light path, while OAP M2 has no hole drilled and redirects light with an angle, in this example, of 60°, between the light source 9 and the second inlet port P2. The light path adjuster comprises two moveable shutters S1, S2 on the inlet and outlet side of the integrating cavity 3, that move in parallel and depending on their position, block light incoming and outgoing from either ports P1 and P3 simultaneously, or P2 and P4 simultaneously.

In the first configuration, the light path adjuster is positioned such that the light reflected and focused from OAP M2 is blocked from entering the cavity 3 via second inlet port P2, such that only the light passing through the hole in OAP M1 enters the cavity 3 via first inlet port P1, and is transmitted along a direct light path 15. This light is directly incident on the liquid sample 7. In parallel, on the outlet side of the cavity 3, the shutter S2 of the light path adjuster is positioned such that second outlet port P4 is closed and light diffusely reflected within the cavity 3 does not reach the spectrometer 11. In parallel, first outlet port P3 is open, such that the light transmitted by the sample 7 can exit the first light outlet port P3, transmitted through the hole drilled in OAP M3 parallel to the light path, and can be focused directly onto the spectrometer 11 via lens L5.

In the second configuration, the shutter S1 of the light path adjuster is positioned such that the light passing through the hole in OAP M1 is blocked from entering the cavity 3 via inlet port P1. As such, the divergent light reaching OAP M1 is collimated and redirected 90° by OAP M1 onto OAP M2 from which it is then focused and redirected at 60° to the to a point at second inlet port P2. The light entering the cavity 3 is then divergent such that the light illuminates the entire transverse width of the sample cuvette, while not allowing any light to be directly transmitted onto the first light inlet port P1. In parallel, on the outlet side of the cavity 3, the shutter S2 of the light path adjuster is positioned such that outlet port P3 is closed and light directly transmitted by the sample 7 does not reach the spectrometer 11. In parallel, outlet port P4 is open, such that the light scattered, transmitted and reflected by the sample 7 is diffusely reflected within the cavity 3 after which it leaves the cavity 3 via second outlet port P4. This divergent light is then collected via OAP M4, collimated and redirected at 90° by OAP M4, onto OAP M3 from which it is redirected at 90° and focused directly onto the spectrometer 11 by OAP M3.

Figure 7:
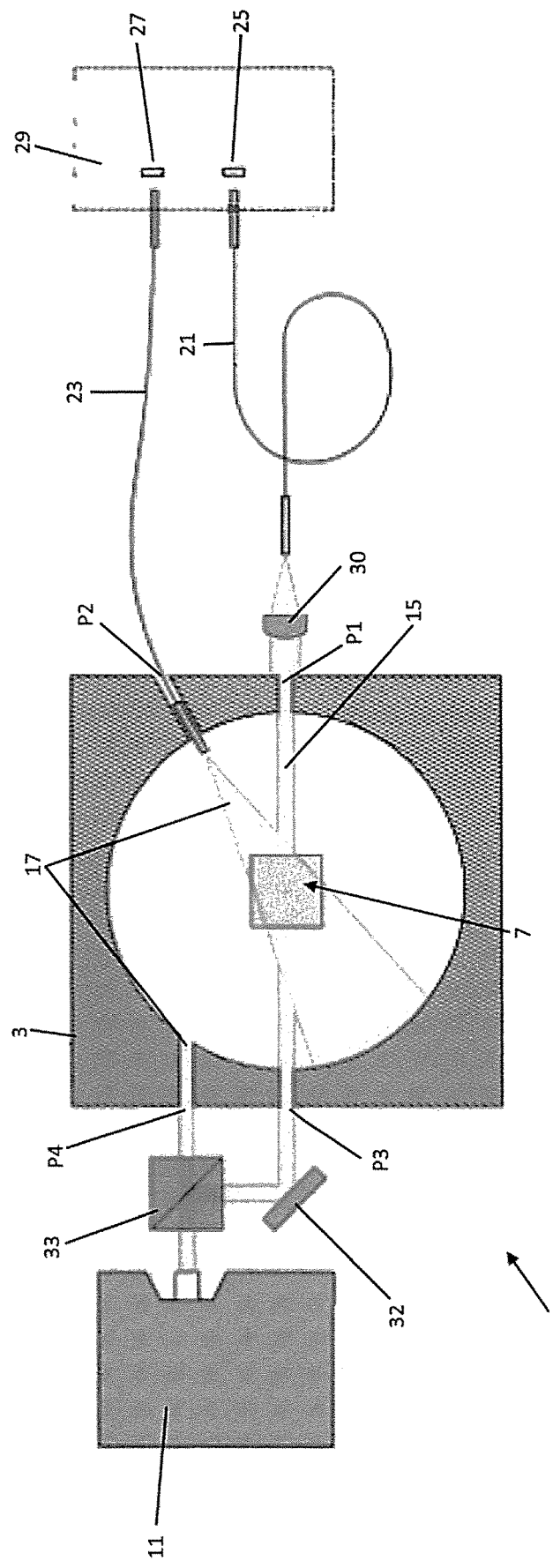
FIG. 7 is a schematic view of a sixth embodiment of a spectrometer apparatus in accordance with the invention, simultaneously illustrating first and second configurations of the apparatus.

Referring now to FIG. 7, a sixth embodiment of apparatus 1 is provided with like features being given like references. In this example, the manipulation of the optical path for two different configurations is provided via a pair of fibre optic cables 21, 23, each of which is associated with a respective light source 25, 27, and with a respective inlet port P1, P2. Each light source 25, 27 may comprise a respective LED source 25, 27 which with an associated LED electronic controller 29 comprise the light adjuster in this example, whereby the provision of light to inlet port P1 or P2 is controlled by suitable activation and deactivation of the LED sources 25, 27 by the controller 29.

In this example, the fibre optic cable 21 supplies light directly to first inlet port P1. Fibre optic cable 23 supplies light to second inlet port P2 via a collimation lens 30.

An outlet mirror 32 and beam splitter 33 are provided between outlet ports P3, P4 and the spectrometer 11 and are configured to allow selectively allow light from first and second outlet ports P3, P4 to reach spectrometer 11 in dependence upon in which configuration the apparatus is operating.

In the first configuration, the apparatus 1 is in a transmission mode in which the light path adjuster, namely the controller 29 is controlled such that light is provided from LED source 25, via first fibre optic cable 21 to inlet port P1. Light entering the cavity 3 through inlet port P1 directly illuminates the liquid contained in the cuvette 7 and the outlet light path adjuster, namely outlet mirror 31 and splitter 33, are configured such that the light collected through outlet port P3, and sent to the spectrometer 11, includes a proportion of light from the first LED source 25 is directly transmitted by the sample after illuminating the sample. In this configuration, the extinction spectrum of the sample is obtained.

In the second configuration, the apparatus 1 is in a diffusely reflecting mode, where the controller 29 controls second LED source 27 to provide light via second fibre optic cable 23 to the second inlet port P2. Light from the LED source 25 entering the cavity 3 through inlet port P2 can either directly illuminate the liquid contained in the cuvette 7 or can be incident on the cavity wall 5 and be diffusely reflected within the cavity 3 before interacting with the liquid sample. In this second configuration, the outlet mirror 31 and/or splitter 33 are configured such that the light transmitted and/or reflected by the sample and collected through second outlet port P4 and sent to the spectrometer 11 has undergone at least one reflection from the cavity walls 5 before entering the outlet port P4. In this configuration, the absorption spectrum of the sample is obtained, free from the effects of scattering by the liquid sample.

The use of independently controllable LED light sources each of which feed a particular inlet port P1, P2 may result in a somewhat simpler apparatus which requires less separate movable and/or fixed optical elements to control the light entering sphere 3, and to allow the apparatus to operate in the first and second configurations.

In this embodiment, inlet port P2 is non-parallel with inlet port P1, such that light enters the cavity via inlet port P2 at an angle inclined to the major axes of the cavity. The position/angle of the port P2 should be chosen so as to minimise the chance for any fresnel reflections from the cuvette 7 exiting through the transmission port P3, P4 upon first reflection when the light hits the cuvette 7. The angle of the light path through port P2 can be selected accordingly.

The movable and/or fixed optical elements may, in an apparatus 1, be selected from:
a. a prism;
b. a lens;
c. a mirror;
d. a diffraction grating;
e. a fibre optic cable;
f. the light source.

Example Components

Provided below is, a non-limiting outline of example components that can be used with some examples of apparatus 1:

Light source 9: A tungsten halogen lamp providing light for excitation from 350-900 nm, purchased from ThorLabs.

Moveable Mirrors (M1, M4, in the example of FIGS. 1, 2a and 2b): Standard optical mirrors mounted 45° to the light path, that can be translated into and out of the beam path for choosing either the first or second configurations. Purchased from ThorLabs.

Fixed Mirrors (M2, M4, in the example of FIGS. 1, 2a and 2b): Standard optical mirrors mounted 45° to the light path that can be translated into and out of the beam path for choosing either the first or second configurations. Purchased from ThorLabs.

Delivery Lens (L2, in the example of FIGS. 1, 2a and 2b): Standard convex lens of defined focal length used for the second configuration to focus the incoming light through inlet port P2 onto the cavity walls 5 for absorption measurements. Purchased from ThorLabs.

Integrating Cavity 3: 50 mm internal diameter spherical integrating cavity with diffusely reflecting inner walls. The sphere has four ports (P1-P4) drilled in the walls for light delivery and collection and a custom drilled sample port on the north pole for suspending the cuvette 7 in the centre of the cavity 3. The integrating cavity 3 is purchased from Avian Technologies. The sphere geometry may be bespoke, to suit the application with which apparatus 1 is used. The cavity 3 may be non-spherical, and could be cylindrical or cuboidal. The coating of walls 5 may have different types of surface reflectivity, including specular and diffuse reflectance or combinations thereof in the UV, visible, or infrared region or combinations thereof.

Sample Holder/Cuvette 7: The cuvette 7 is held in the apparatus 1 via a holder that clamps around the cuvette 7 and also allows the cuvette 7 to be suspended within the cavity 3 at a fixed position. The following cuvette geometries may be provided: standard (1 cm square), thin or plate-like (10×1 mm), cylindrical, spherical (combinations are possible too, e.g. cylindrical with a flat region)

USB Spectrometer 11: Analyzes the intensity of the light leaving the cavity 3 as a function of wavelength, allowing a spectrum to be obtained and displayed on, for example, a computer screen. This may be a stand-alone device powered and interfaced via USB connection to a controller in the form of a laptop/computer. Light detection may be as per a standard spectrometer with dispersive optics and detection via CMOS, CCD, diode-array, or scanning-monochromator.

Electronics: The movable mirrors are driven by stepper motors, and controlled by programmable micro-controller with stepper motor driver board. Both micro-controller and the USB spectrometer are attached to a controller such as a mini-computer internal to the apparatus 1. The purpose of the mini-computer is two-fold, i) it facilitates communication with the spectrometer 11 and with the motor driver, and ii) it provides a web-based graphical user interface. This facilitates interaction with the apparatus 1 in that there is no need for the user to install special software, and no need for the developer to maintain operating-system dependent custom software.

Light sources: standard UV-VIS (i.e. Halogen, Xenon, Deuterium lamps), LEDs of any sort, lasers, combinations of all these; and any polychromatic source with attached monochromator for wavelength selection.

Delivery optics: assemblies of standard optical components such as lenses, mirrors, shutters, diffraction gratings, optical fibers, or any combinations thereof.

Light-path switching: Motorised linear stage(s) and/or shutter(s).

Parameters/Variables

There are a number of physical and geometrical parameters/variables which are factors in the design and operation of an apparatus 1 as described above, which include any one or more of the following:

Cavity Surface reflectivity p is the ratio of reflected to incident light rays. For the operation of the cavity in line with apparatus 1, is the reflectivity must be close to unity, i.e. the walls 5 comprise highly reflective material. The apparatus 1 further requires the reflectivity to be strongly diffuse (Lambertian).

Port fraction f is the ratio of the surface area of all cavity ports P1-P4 to the total surface area of the walls 5 of the cavity 3. A ray of light randomly traversing the cavity 3 thus has a chance f to escape.

Enhancement factor M: approximately encodes the number of diffuse cavity surface reflections a ray will undergo before either absorbed by the walls of the cavity or leaving via a port. In the ideal case of an empty spherical cavity we have $$M = \frac{\rho}{1-\rho(1-f)}.$$

Chance to hit the sample μ: a purely geometric factor, states the probability for a ray which diffusely reflected off the cavity surface to interact with the sample cuvette.

Path-length L is the average length of the path a ray of light takes within the sample volume. L is large if M and i are large.

Apparatus Calibration/Measurements/Control Overview

The following factors form the basis for the apparatus 1 in order to obtain error free spectra:

Relating to absorbance measurements:

The controller determines the absolute absorption cross-section of samples inserted into an integrating cavity; this requires accurate calibration of measureable intensities against known standards.

Input port positions for absorbance: There are two options for the placement of this port:
  i) Avoiding direct illumination of the sample improves reproducibility of measurements as it is less sensitive on the exact geometric replacement of the sample cuvette. The disadvantage of this approach is that some light reaches the detector (determined by μ) without interacting with the sample, even for a fully absorbing sample, which limits the range of measurable optical density.
  ii) Alternatively all incident rays can be made to pass through the sample. This solves the problem of saturating absorbance and allows the measurement of strongly absorbing samples. In this case the detection port needs to collect from a section of the cavity wall which does not receive light from direct or reflected illumination.

Detection port positions for absorbance: The field of view of the detection port must not intersect the sample, instead it should gather light only from the cavity surface. This minimizes the dependence of the measurement on the scattering properties of the sample.

Geometric optimization of the setup: the average pathlength in the sample, L, can be approximated by the ratio of the sample volume and the cavity volume, $rV=V_{sample}/V_{cavity}$, multiplied by the average chord length in the cavity, $\bar{c}=4V_{cavity}/A_{cavity}$ (where $A_{cavity}$ is the surface area of the cavity), and by the enhancement factor M. The approximate pathlength $L=rV\bar{c}M$ governs the lower limits of the detectable optical density; for example, for low-absorbance samples it is desirable to maximise L: i) M becomes maximal for a cavity surface reflectivity $p\rightarrow 1$ and cavity port fraction $f\rightarrow 0$, ii) rV increases with the relative sample volume and approaches one as the sample fills the sphere entirely, iii) $\bar{c}$ is maximal for a spherical cavity. A spherical cavity filled entirely by the sample, with maximal surface reflectivity and minimal port openings may be an optimal setup for detection of ultra-low concentrations.

It is not straight-forward to choose a combination of parameters (cavity and sample geometries, port locations, numerical apertures, etc.) which fit the requirements of validity, reproducibility, and user-convenience. The design choices may be a non-trivial compromise. For example, the apparatus 1 described above is suited for standard cuvettes, including cuvettes with short optical pathlength for strongly absorbing liquids.

Relating to combined extinction-absorbance measurements:
  extinction measurements are performed inside an integrating cavity; this comes with geometric constraints in that the sample walls must be perpendicular to the incident beam, which requires a square or flat-walled cuvette. Cuvettes with curved surfaces (e.g. cylindrical)

are also possible, but would require specialised optics to counter the refractive effects.

The numerical aperture available in both delivery and detection needs to be constrained in order to avoid diffuse illumination of the sample and to minimize detection of multiple-scattering light.

Combined delivery and detection optics capable of switching between the absorption and extinction pathways are required. The arrangement of these pathways must ensure that they do not affect each other.

Apparatus Calibration/Measurements/Control Example Detail

Detail of an example calibration method that could be used to calibrate a spectrometer apparatus as described above, is set out in the attached Appendix.

The spectrometer apparatus may be configured to measure spectra of a liquid sample selected from any one or more of the following:
a. Water;
b. Wine;
c. A beverage;
d. An edible liquid or partially liquid product;
e. Paint;
f. Water, such as seawater;
g. Nanoparticles;
h. Emulsions;
i. Blood In one example the spectrometer apparatus may therefore be a wine testing apparatus. The above list is non-limiting.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this invention has been described by way of example and with reference to possible embodiments thereof, it is to be understood that modifications or improvements may be made thereto without departing from the scope of the invention. The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

Any discussion of the prior art throughout the specification should in no way be considered as an admission that such prior art is widely known or forms part of common general knowledge in the field.

The invention claimed is:

1. A spectrometer apparatus for measuring spectra of a liquid sample, the spectrometer apparatus comprising:
   an integrating cavity comprising a reflective inner wall or walls, and configured to receive a cuvette containing liquid sample within the integrating cavity,
   wherein the integrating cavity comprises at least one light inlet port and at least one light outlet port, the or each light inlet port being configured to receive light from at least one light source and the or each light outlet port being configured to deliver light to a spectrometer;
   the spectrometer apparatus further comprising at least one light path adjuster configured to selectively adjust a light path through the integrating cavity such that at least two distinct light paths are provided; wherein
   when the light path adjuster is in a first configuration, the spectrometer apparatus is in a transmission mode in which light from the light source follows a first light path from the or one of the light inlet port(s) to the liquid sample such that the light from the light source irradiates the liquid sample directly before the light transmitted by the liquid sample is transmitted through the or one of the light outlet port(s) and received by the spectrometer for wavelength analysis of the light to provide an extinction spectrum of the liquid sample; and
   when the light path adjuster is in a second configuration, the spectrometer apparatus is in a diffusely reflecting mode in which light from the light source follows a second light path from the or one of the light inlet port(s) into the integrating cavity, is incident onto the reflective inner wall or walls of the integrating cavity and is diffusely reflected within the integrating cavity, such that the light from the light source irradiates the liquid sample before being transmitted through the or one of the light outlet port(s) and received by the spectrometer for wavelength analysis of the light to provide an absorbance spectrum of the liquid sample contained in the cuvette.

2. The spectrometer apparatus of claim 1 arranged such that, when in the second configuration, light from the second light path is transmitted:
   a. directly from the light inlet port onto the reflective inner wall or walls of the integrating cavity; and/or
   b. directly from the light inlet port, onto and through the liquid sample and subsequently onto the reflective inner wall or walls of the integrating cavity.

3. The spectrometer apparatus of claim 1 wherein the light inlet port used in the first configuration is directly opposed from the light outlet port used in the first configuration such that, when in the first configuration, the first light path extends directly across the integrating cavity.

4. The spectrometer apparatus of claim 1 further comprising the light source and/or the spectrometer.

5. The spectrometer apparatus of claim 1 further comprising a controller configured to control the light path adjuster to selectively adjust the path of light through the spectrometer apparatus, wherein the controller is an integral part of the spectrometer apparatus and is in direct communication with the spectrometer apparatus, and/or the controller is remote from the spectrometer apparatus and is configured to be in wireless communication with a transceiver of the spectrometer apparatus, and/or wherein the controller is configured to control the spectrometer, and in particular is configured to process the light received by the spectrometer for wavelength analysis of the light to provide the extinction and/or absorbance spectrum of the liquid sample contained in the cuvette.

6. The spectrometer apparatus of claim 5 wherein the controller is configured to control one or more of:
   a. switching between the first and second configurations;
   b. acquiring spectra from the integrating cavity;
   c. choosing operating conditions;
   d. displaying spectra on a display of the spectrometer apparatus, or of the controller, or in communication with the spectrometer apparatus or controller;
   e. saving data on a memory of the spectrometer apparatus, or of the controller, or in communication with the spectrometer apparatus or controller;
   f. a user-interface of the spectrometer apparatus, or of the controller, or in communication with the spectrometer apparatus or controller, that interacts with the spectrometer apparatus and allows a user to control the position of the light path adjuster.

7. The spectrometer apparatus of claim 1 wherein the light path adjuster comprises at least one movable optical element configured to manipulate light incident on the optical element from the light source, the light path adjuster being configured to adjust the movable optical element to selectively provide the first and second light paths, and/or the light path adjuster comprises at least one fixed optical element which is not adjustable with respect to the integrating cavity, and wherein the movable optical element or the fixed optical element is selected from:
a. a prism;
b. a lens;
c. a mirror;
d. a diffraction grating;
e. a fibre optic cable;
f. the light source.

8. The apparatus of claim 7 wherein the optical element is adjustable by moving the optical element with respect to the integrating cavity from a first position in which the light travels along the first light path, and a second position in which the light travels along the second light path, and/or wherein the integrating cavity comprises orthogonal longitudinal, vertical, transverse axes, and any one or more of the following positional characteristics of the optical element may be adjusted with respect to any one or more of the axes:
a. longitudinal position;
b. vertical position;
c. transverse position
d. orientation;
e. inclination.

9. The spectrometer apparatus of claim 1 wherein the light path adjuster comprises at least one electronic controller operative to effect selective operation of one or more light sources, to selectively provide the first and second light path.

10. The spectrometer apparatus of claim 1 wherein a plurality of light inlet ports are provided, the light path adjuster being configured to provide the first light path by directing light from the light source through a first light inlet port, and to provide the second light path by directing light from the light source through a second light inlet port.

11. The spectrometer apparatus of claim 1 wherein a plurality of light outlet ports are provided, the first light path directing light from the integrating cavity through a first light outlet port, and the second light path directing light from the integrating cavity through a second light outlet port.

12. The spectrometer apparatus of claim 1 wherein the integrating cavity comprises any one of:
a. a diffusely reflecting spherical integrating cavity;
b. a cylindrical cavity;
c. a cuboidal or square cavity.

13. The spectrometer apparatus of claim 1 wherein the integrating cavity comprises an internal coating configured to provide any one or more of:
a. specular reflectance;
b. diffuse reflectance;
c. reflectance in the UV light spectrum;
d. reflectance in the visible light spectrum;
e. reflectance in the infra-red spectrum.

14. The spectrometer apparatus of claim 1 being a UV-VIS spectrometer apparatus.

15. The spectrometer apparatus of claim 1 further comprising a sample holder configured to retain a cuvette containing liquid sample within the integrating cavity.

16. The spectrometer apparatus of claim 1 wherein the light source comprises first and second light sources, and the light path adjuster comprises a controller configured to control the first and second light sources such that when in the first configuration, the first light source is controlled to provide light on the first light path, and when in the second configuration the second light source is controlled to provide light on the second light path.

17. The spectrometer apparatus of claim 16 wherein the first light source is associated with a collimation lens positioned between the first light source and the light inlet port associated with the first light source.

18. The spectrometer apparatus of claim 16 further comprising first and second outlet ports, and a beam splitter configured to selectively allow light from the first and second outlet ports to be transmitted to the spectrometer.

19. A method of measuring spectra of a liquid sample using the spectrometer apparatus of claim 1, comprising steps of:
a. activating the light source;
b. controlling the light path adjuster to be in the transmission mode or the diffusely reflecting mode; and
c. conducting wavelength analysis of the light transmitted through the light outlet port via the spectrometer for wavelength analysis of the light to provide an absorbance spectrum of the liquid sample contained in the cuvette.

20. A spectrometer apparatus for measuring spectra of a liquid sample, in particular where the spectra obtained are the absorption and extinction spectra of the liquid sample, the spectrometer apparatus comprising:

an integrating cavity comprising a reflective inner wall or walls, and configured to receive a cuvette containing liquid sample within the integrating cavity, wherein the integrating cavity comprises at least one light inlet port and at least one light outlet port, the light inlet port being configured to receive light from a light source and the light outlet port being configured to deliver light to a spectrometer;

the spectrometer apparatus further comprising a light path adjuster configured to selectively adjust a light path through the integrating cavity such that at least two distinct light paths are provided; wherein:

when the light path adjuster is in a first configuration, the spectrometer apparatus is in a transmission mode in which light from the light source follows a first light path from the light inlet port to the liquid sample such that the light from the light source irradiates the liquid sample directly before the light transmitted by the liquid sample is collected via the light outlet port and received by the spectrometer for wavelength analysis of the light to provide an extinction spectrum of the liquid sample; and when the light path adjuster is in a second configuration, the spectrometer apparatus is in a diffusely reflecting mode in which light from the light source follows a second light path from the light inlet port into the integrating cavity, and is incident onto either the reflective inner wall or walls of the integrating cavity or directly onto the liquid sample;

wherein light transmitted and/or scattered by the liquid sample is transmitted through the light outlet port, the spectrometer apparatus being configured such that light directly transmitted by the liquid sample is reflected by the reflective inner wall or walls of the integrating cavity before being transmitted through the light outlet port, and received by the spectrometer for wavelength analysis of the light to provide an absorbance spectrum of the liquid sample contained in the cuvette.

* * * * *